(12) United States Patent
Duerr et al.

(10) Patent No.: US 7,147,280 B2
(45) Date of Patent: Dec. 12, 2006

(54) HOLDING RECEPTACLE FOR VEHICLES

(75) Inventors: Bernhard Duerr, Calw (DE); Frank Emhardt, Stuttgart (DE); Hermann Gaus, Stuttgart (DE); Thomas Geisel, Rottenburg (DE); Rainer Leucht, Baltmannsweiler (DE); Ralf-Henning Schrom, Rottenburg (DE); Rainer Tiefenbacher, Steinenbronn (DE)

(73) Assignee: DaimlerChrysler AG, Stuttgart (DE)

( * ) Notice: Subject to any disclaimer, the term of this patent is extended or adjusted under 35 U.S.C. 154(b) by 83 days.

(21) Appl. No.: 10/497,684

(22) PCT Filed: Oct. 23, 2002

(86) PCT No.: PCT/EP02/11827

§ 371 (c)(1),
(2), (4) Date: Nov. 15, 2004

(87) PCT Pub. No.: WO03/047906

PCT Pub. Date: Jun. 12, 2003

(65) Prior Publication Data

US 2005/0062320 A1 Mar. 24, 2005

(30) Foreign Application Priority Data

Dec. 5, 2001 (DE) .............................. 101 59 759

(51) Int. Cl.
*B60N 2/46* (2006.01)
*A47B 83/02* (2006.01)
*A47C 7/54* (2006.01)
*A47C 7/68* (2006.01)
*A47C 7/70* (2006.01)

(52) U.S. Cl. .................. 297/188.01; 297/188.14; 297/188.19; 297/411.2; 297/411.46; 297/112; 297/115; 297/147; 297/162; 297/173

(58) Field of Classification Search ........... 297/188.01, 297/188.12, 188.13, 188.14, 188.19, 188.2, 297/411.2, 411.46, 112, 115, 162, 147, 173
See application file for complete search history.

(56) References Cited

U.S. PATENT DOCUMENTS

| 4,416,488 A | * | 11/1983 | Wall ................... 297/188.14 X |
| 4,509,097 A | * | 4/1985 | Robinson ........... 297/188.14 X |
| 4,733,901 A | * | 3/1988 | Okuyama ............... 297/112 X |
| 5,730,491 A | | 3/1998 | Carlsen et al. ......... 297/188.19 |
| 5,752,740 A | * | 5/1998 | Volkmann et al. ..... 297/188.19 |
| 5,845,965 A | * | 12/1998 | Heath et al. ........... 297/188.19 |
| 6,045,173 A | * | 4/2000 | Tiesler et al. ....... 297/188.19 X |
| 6,135,529 A | | 10/2000 | De Angelis et al. |
| 6,419,314 B1 | * | 7/2002 | Scheerhorn ............ 297/188.19 |

(Continued)

FOREIGN PATENT DOCUMENTS

DE 2758066 A1 6/1979

(Continued)

*Primary Examiner*—Rodney B. White
(74) *Attorney, Agent, or Firm*—Crowell & Moring LLP

(57) ABSTRACT

A holding receptacle for vehicles, which, when installed, is integrated in a passenger compartment of the vehicle, has two side walls which are connected to each other in the region of their ends by transverse walls and a bottom to form an upwardly open box which can be used as a storage space. The suitability for a design which is advantageous with regard to weight is improved. It is proposed that a lightweight supporting frame having side wall structures and at least one crossmember structure is provided as the load-bearing structure of the holding receptacle, with a box-shaped insert containing the storage space being held by the supporting frame.

8 Claims, 5 Drawing Sheets

U.S. PATENT DOCUMENTS 6,616,206 B1 * 9/2003 Luginbill et al. ... 297/188.19 X
6,719,367 B1 * 4/2004 Mic et al. .............. 297/188.19
6,793,281 B1 * 9/2004 Duerr et al. ................ 297/147
6,843,528 B1 * 1/2005 Glynn et al. ........ 297/188.19 X

FOREIGN PATENT DOCUMENTS

| | | |
|---|---|---|
| DE | 19615320 | 5/1997 |
| DE | 19826943 | 12/1999 |
| DE | 29922694 U1 | 3/2000 |
| DE | 19932772 | 12/2000 |
| EP | 1160125 A2 | 12/2001 |

* cited by examiner

HOLDING RECEPTACLE FOR VEHICLES

BACKGROUND AND SUMMARY OF THE INVENTION

The present invention relates to a holding receptacle for vehicles.

German publication DE 27 58 066 A1 discloses a holding receptacle which is arranged in a space between two rear seats of a motor vehicle. The holding receptacle is designed in such a manner that two side walls together with transverse walls and a bottom form an upwardly open built-in box which serves as a storage space, for example, for bottles or ice buckets. The upwardly facing opening of the built-in box can be closed by a lid which is hinged pivotably on the holding receptacle and which may also be used as an arm rest or table. In this case, the self-supporting built-in box has a relatively high dead weight, particularly since it has to absorb all of the forces introduced via the hinged lid.

Since the built-in box also has to be matched as precisely as possible to the existing built-in space in order for the arrangement to give a good impression of quality, the installation of the holding receptacle lasts for a correspondingly long time, which may be undesirable for economic reasons. Also, the built-in box cannot easily be adapted to different requirements, for example if the built-in box is to have compartment divisions which differ according to the particular customer's requirements.

German publication DE 299 22 694 U1 discloses a holding receptacle for vehicles which is integrated in an arm rest. This holding receptacle can be used for cooling drinks or foodstuffs or keeping them warm.

Both Japanese publication JP 103 15 864 A and U.S. Pat. No. 6,135,529 show holding receptacles for motor vehicles which are arranged between two front seats.

Finally, U.S. Pat. No. 5,730,491 discloses a holding receptacle for motor vehicles which has a lightweight supporting frame as the load-bearing structure for a box-shaped insert.

The present invention has as one object the object of providing a holding receptacle of the type mentioned, the suitability of which, for a design which is advantageous with regard to weight, a more economic assembly and an adaptation to different equipment requirements of the customers, is significantly improved.

This object is achieved according to the invention by the features claimed.

Advantageous refinements of the invention are apparent from dependent claims.

With the division of the built-in box into a load-bearing lightweight structure and an insert, there is the advantageous possibility of combining a standard lightweight structure with inserts having different divisions. The formation of variants with inserts of this type, which preferably consist of plastic, is possible relatively cost-effectively.

In this case, the lightweight construction can advantageously be designed in such a manner that it is suitable for use in different types of vehicle. Owing to this standardization, a particularly economic manufacturing of the supporting structure is possible.

Owing to the fact that the box-shaped insert is held on its front and rear end sides by two crossmember structures, the insert can easily be fitted into the supporting frame. This has the advantage that the assembly of the holding receptacle can be further simplified.

In order to widen the formation of variants, the supporting frame may be extended forward over the box-shaped insert. Different functional units may then be accommodated, depending on requirements, in this region of the supporting frame.

The lever forces which are effective in a folding table, when transferring the folding table from its nonfunctional position into its functional position for example, can be absorbed particularly readily if the folding table is hinged in the region of the supporting frame which is close to the floor.

In order to accommodate commercially available bottles in a space-saving manner in the insert designed as a cooling receptacle, the insert may have a trapezoidal longitudinal section, with the longitudinal extent of the cooling receptacle significantly exceeding its height.

By making a circular cutout in the rectangular basic surface of the side wall structures, an optimum distribution of forces in the supporting frame is achieved in particular if a lid for the box-shaped insert is hinged to the supporting frame.

The holding receptacle may be extended into the region of the seat back by means of a tower attachment. This has the advantage that further functional units, for example CD or DVD drives, can be accommodated next to the vehicle seat in a readily accessible manner for the vehicle occupant.

In order to support the tower attachment on the body shell structure of the vehicle, the side wall structures of the tower attachment are designed in a manner such that they are widened upward in the longitudinal direction of the vehicle from the fastening to the holding receptacle. The resultant rear end wall which runs at an inclination can then be used to fasten the tower attachment, for example, to the rear wall of the seat.

The compartment bottoms which are formed by crossmember structures enable internal components to be accommodated in the tower attachment, it being possible for these internal components to be pushed into the compartment bottoms in a simple manner. As a result, the tower attachment can be adapted cost-effectively to the particular equipment requirements.

In order to integrate the holding receptacle into the vehicle in a manner corresponding to the interior fittings, the side wall structures can be covered on their side facing the vehicle seat by large paneling parts.

A preferred embodiment of the invention is explained below with reference to the drawings.

DETAILED DESCRIPTION OF THE INVENTION

Figure 1:
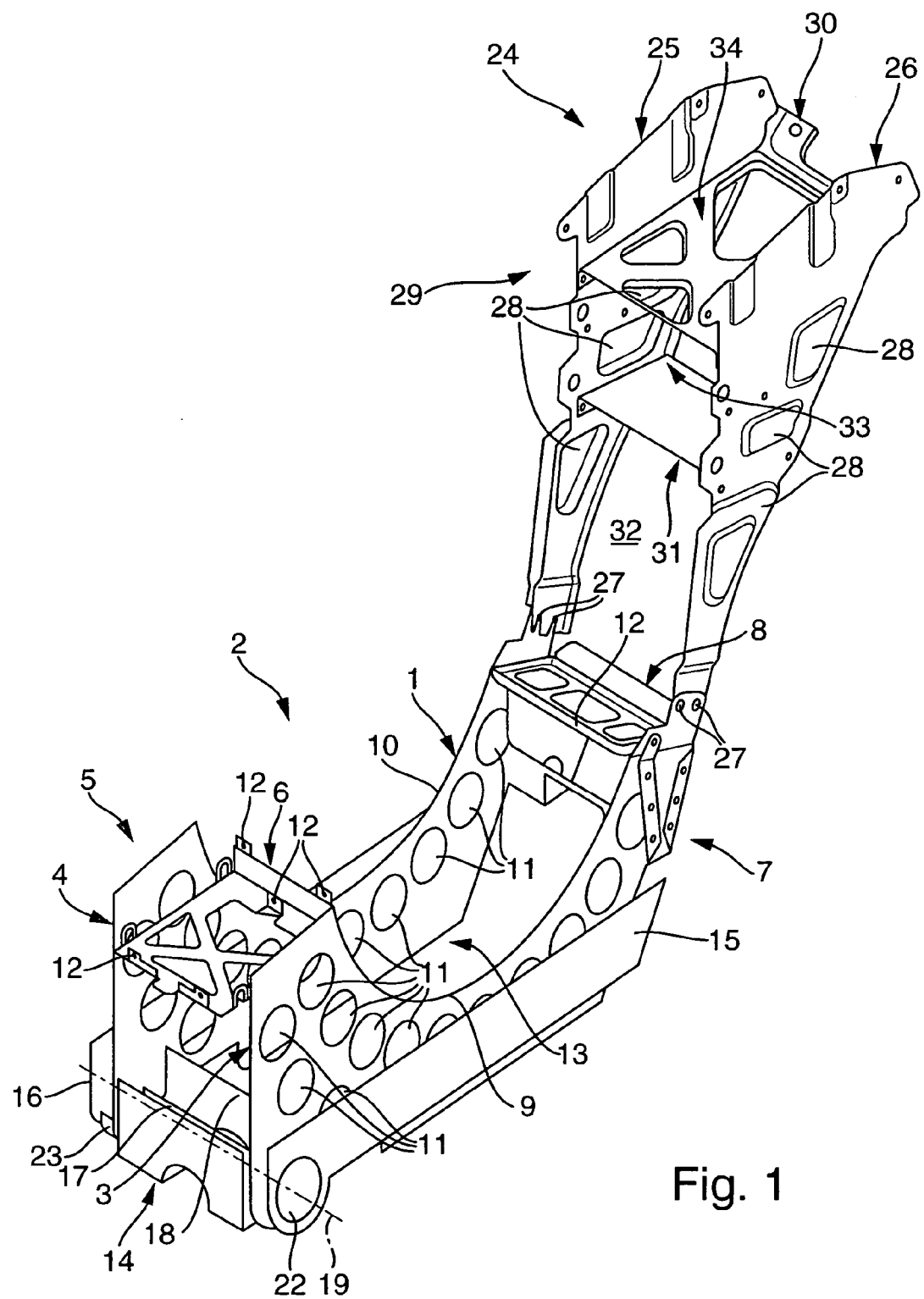
FIG. 1 is a perspective illustration of a supporting frame for a holding receptacle obliquely from the front.

The supporting frame 1, which is illustrated in FIG. 1, of a holding receptacle 2 comprises two side wall structures 3 and 4 which are arranged in a mirror-inverted manner and are connected to each other in their front region 5 by a crossmember structure 6 and are connected to each other in their rear region 7 by a crossmember structure 8.

The side wall structures 3 and 4 each have a rectangular basic surface with an approximately circular indentation 9 or 10 made in the upper longitudinal side thereof. In addition, for lightweight reasons, a plurality of circular cutouts 11 are left open in a row at a distance from the indentations 9 and 10.

The two crossmember structures 6 and 8 are of lattice-type design and have a plurality of fastening elements 12 for the attachment of functional elements. A storage space 13 is formed by the side wall structures 3 and 4 and the crossmember structures 6 and 8.

Plates 15 and 16 are arranged in the lower region 14 of the supporting frame 1, in each case at a distance from the side wall structures 3 and 4, and extend over the entire length of the side wall structures 3 and 4.

In the front region 5 of the side wall structures 3 and 4, two transverse plates 17 and 18, which are arranged close to the floor and run parallel to each other, connect the side wall structures 3 and 4 to each other. Running between the two transverse plates 17 and 18 is a geometrical pivot axis 19 for folding-table arrangements 20 and 21 which have still to be described below and are fastened in each case to the supporting frame 1 at a respective hinge point 22 and 23.

A tower attachment 24 is connected above the rear crossmember structure 8 and extends the supporting frame 1 upward in the region of a seat back (not illustrated here).

The tower attachment 24 is formed by two wedge-shaped side wall structures 25 and 26 which are connected to the side wall structures 3 and 4 via screw or welding connections 27. The side wall structures 25 and 26 are provided with recesses 28 likewise for lightweight construction reasons.

Two crossmember structures 30 and 31 which run parallel to each other and are orientated horizontally are arranged in the upper end region 29 of the tower attachment 24, so that three storage spaces 32, 33 and 34 are produced.

Figure 2:
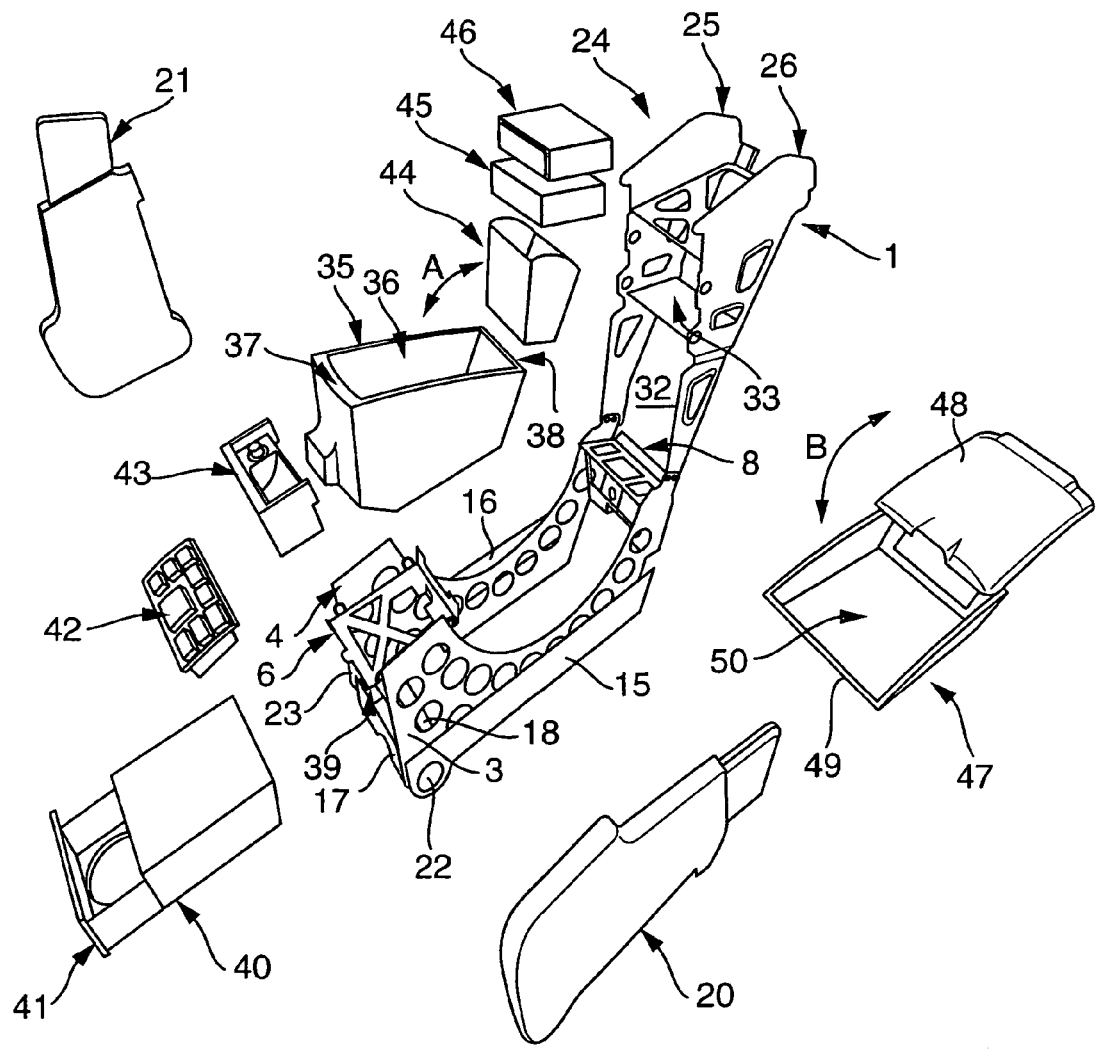
FIG. 2 is an exploded illustration of the holding receptacle.

The accommodation of functional units in the supporting frame 1 will be explained in greater detail with reference to FIG. 2.

The storage space 13 holds a box-shaped insert 35, the interior of which is designed as a cooling receptacle 36. The box-shaped insert 35 has a trapezoidal longitudinal section and is fitted with its front end edge 37 onto the crossmember structure 6 and with its rear end edge 38 onto the crossmember structure 8, so that the cooling receptacle 36 can easily be removed and re-inserted, for example for cleaning. On both sides of the side wall structures 3 and 4, the two folding-table arrangements 20 and 21 are hinged at the hinge points 22 and 23 in such a manner that they are put away between the side wall structures 3 and 4 and the plates 15 and 16 in the nonfunctional position.

A further storage space 39 is formed between the front crossmember structure 6 and the transverse plates 17 and 18, and a cup holder housing 40 having a cup holder 41 is accommodated therein.

A switch module 42 and an ashtray 43 are arranged above the crossmember structure 6.

The storage space 32 of the tower attachment 24 holds a tilting box 44 which can be pivoted according to the arrow direction A and is hinged in the lower region between the side wall structures 25 and 26 of the tower attachment 24. A DVD drive 45 and a CD player 46 are accommodated in the storage space 33 situated above it.

The box-shaped insert 35 is closed by an armrest 47 which is hinged pivotably on the rear crossmember structure 8. In order to be able to operate the cooling receptacle 36, only the armrest 47 therefore has to be pivoted upward according to the arrow direction B. The armrest 47 comprises an upper shell 48 and a lower shell 49 which form an additional storage space 50 in which, for example, a telephone unit can be accommodated in a space-saving manner.

Figure 3:
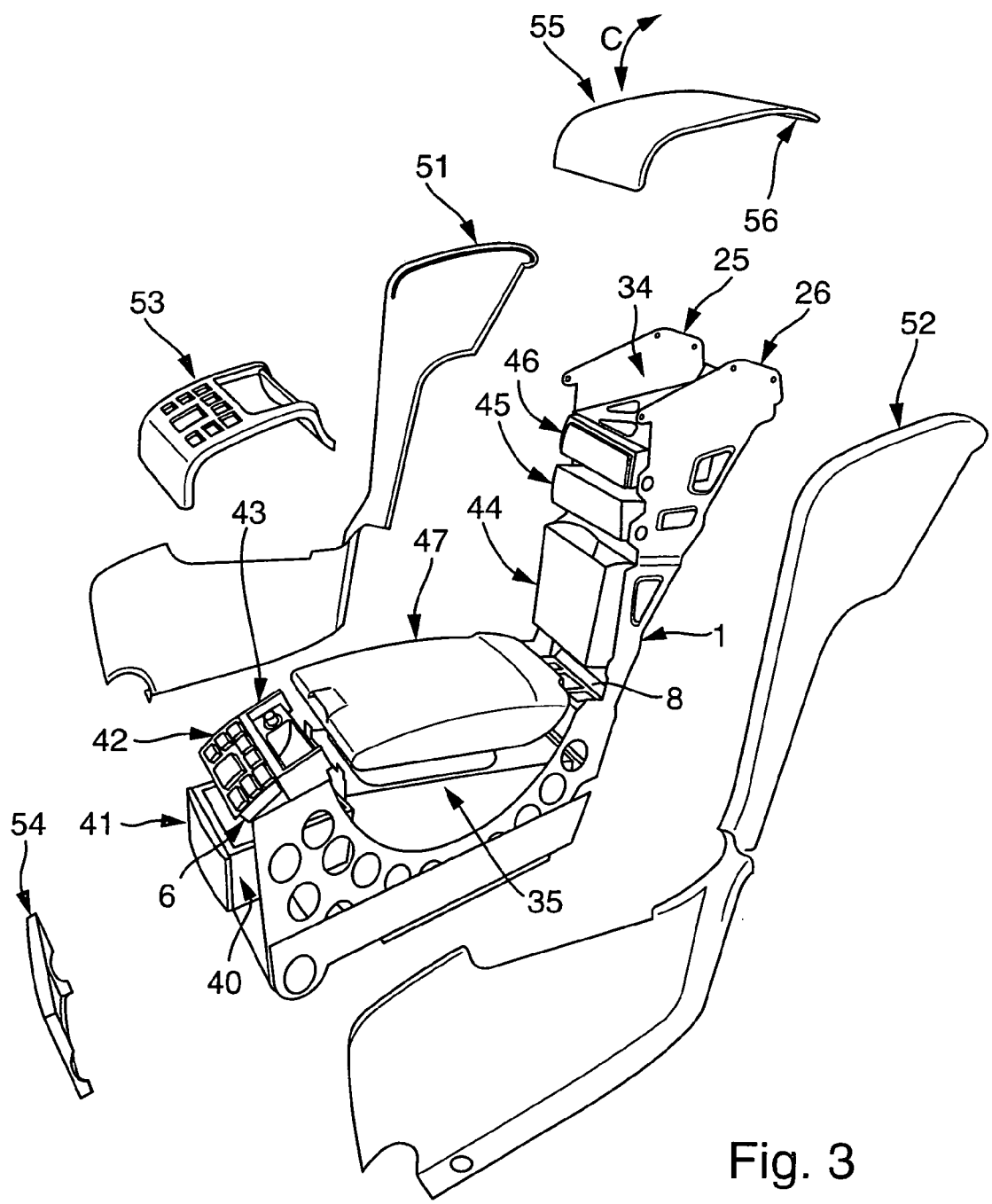
FIG. 3 is an illustration of the holding receptacle with paneling parts.

The manner in which the functional elements which have been described are accommodated within the supporting frame 1 becomes clear from the illustration in FIG. 3.

For adaptation of the holding receptacle 2 to the interior fittings of the particular vehicle, the side wall structures 3 and 4 are covered over an extensive area with paneling parts 51 and 52.

The switch module 42 and the ashtray 43 are provided with a cover 53 which extends from the box-shaped insert 35 as far as the cup holder housing 40. The region below the cup holder 41 is covered by a covering 54.

The uppermost storage space 34 of the tower attachment 24 can be closed by a lid 55 which is hinged at its rear edge 56 on the tower attachment 24. The storage space 34 is therefore easily accessible by pivoting the lid 55 according to the arrow direction C.

Figure 4:
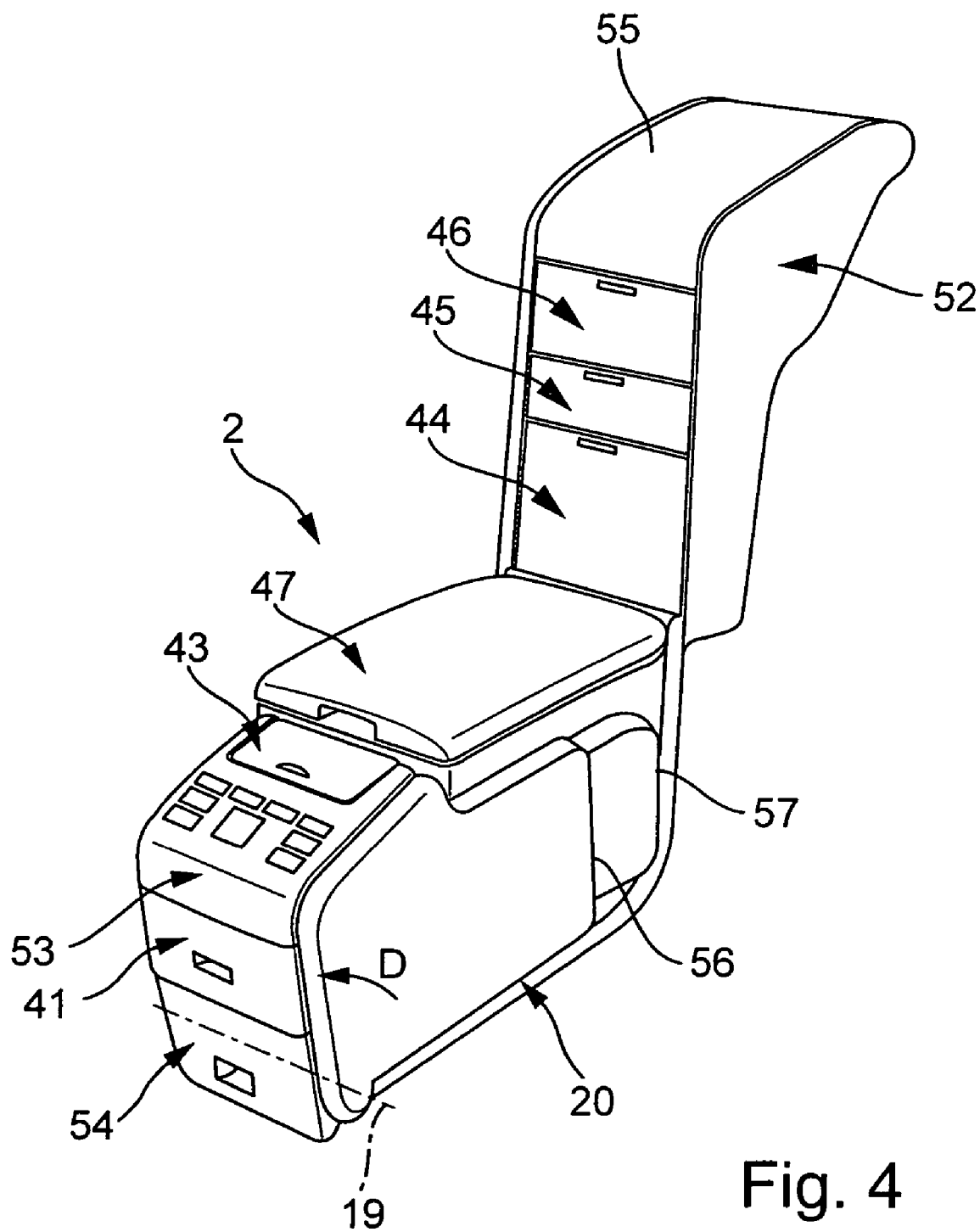
FIG. 4 is an assembly illustration of the holding receptacle.

The appearance of the holding receptacle 2 when completely assembled is apparent from FIG. 4.

The visible folding-table arrangement 20 comprises a holding housing 56 in which a plate arrangement 57 is inserted. In order to transfer the folding-table arrangement 20 from the nonfunctional position (which is illustrated) into the functional position, the folding-table arrangement 20 is pivoted upward about the pivot axis 19 in the arrow direction D, so that the holding housing 56 forms the table leg. The plate arrangement 57 is then pulled upward out of the holding housing 56 and folded next to the supporting frame 1, so that the plate arrangement 57 comes to lie above the vehicle seat.

Figure 5:
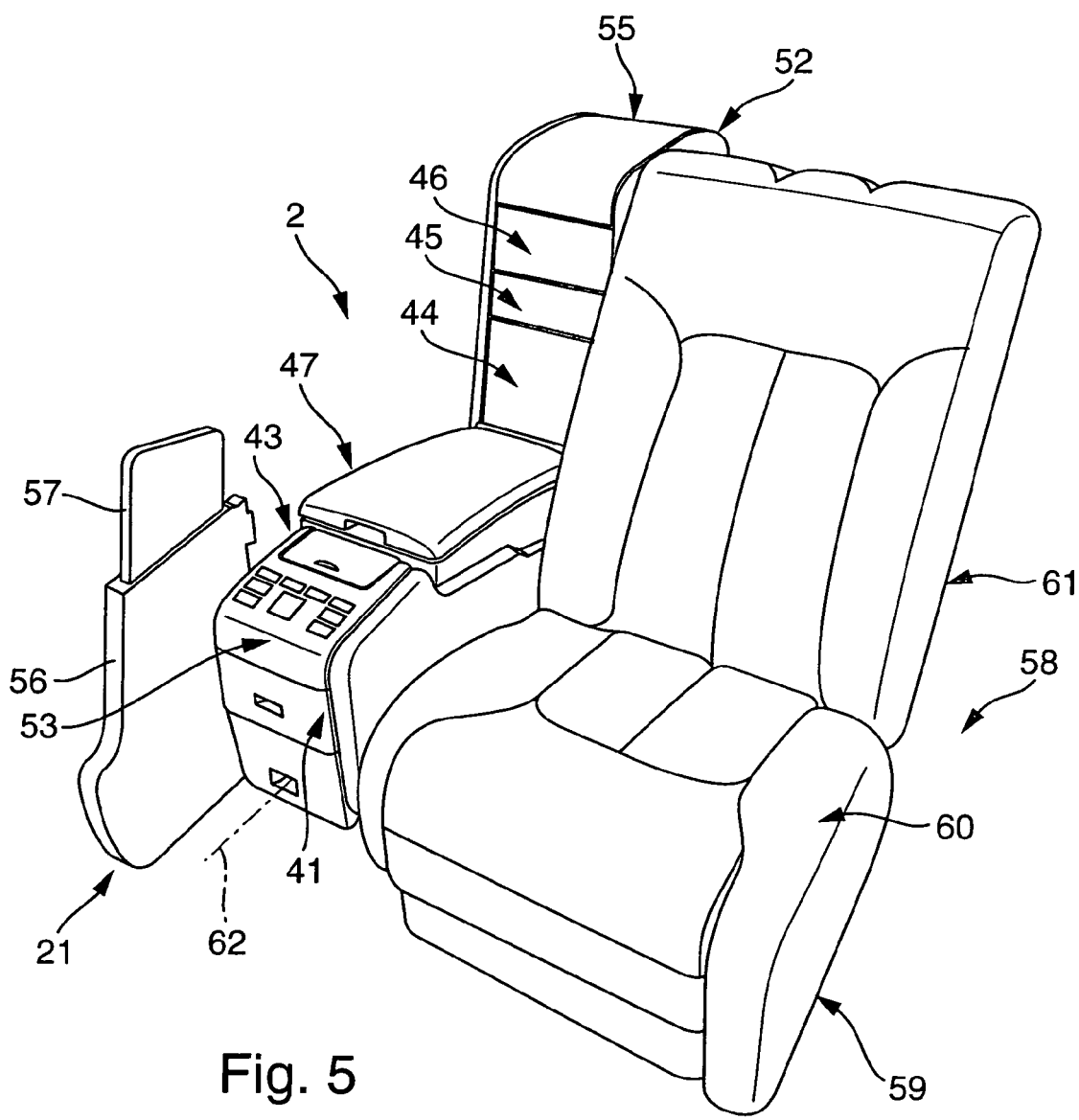
FIG. 5 is an illustration of the holding receptacle in the installed position next to a vehicle seat.

The arrangement of the holding receptacle 2 with respect to a vehicle seat 58 is illustrated in FIG. 5.

In the illustration in FIG. 5, the holding receptacle 2 is provided as a central console in a rear seat arrangement 58. Of the rear seat arrangement 58, only the left vehicle seat 59 with seat cushion 60 and seat back 61 is illustrated. The right vehicle seat is arranged in a mirror-inverted manner with respect to the longitudinal axis 62 of the vehicle.

It is also conceivable not to accommodate the holding receptacle 2 between two vehicle seats, but rather to accommodate it just on one side of the vehicle seat, so that a separate holding receptacle 2 is provided for each vehicle seat.

The invention claimed is:

1. A holding receptacle for vehicles, which, when installed, is integrated in a passenger compartment of the vehicle, comprising:
two supporting frame side wall structures which are connected to each other by a bottom and, in regions of their ends, by transverse supporting frame crossmembers so as to form an upwardly open storage space, the side wall structures and the crossmembers forming a lightweight supporting frame provided as a load-bearing structure,
a box-shaped insert which can be held by the supporting frame and having an interior receptacle, and
a tower attachment which can be fastened to the supporting frame side wall structures in one of the end regions, the tower attachment including two further side wall structures which extend from the supporting frame side wall structures upward to a seat back region of the attachment, wherein the further side wall structures of the tower attachment are widened in a wedge-shaped manner upward starting from their connections to the light-weight supporting frame.

2. The holding receptacle as claimed in claim 1, wherein the box-shaped insert is held on its front and rear end sides by the supporting frame crossmembers.

3. The holding receptacle as claimed in claim 2, wherein a region of the supporting frame which extends forward with respect to the box-shaped insert is designed as a holding space for functional units.

4. The holding receptacle as claimed in claim 3, wherein a folding table arrangement is hinged in a region, which is close to the floor, of that region of the supporting frame which extends forward, and wherein a working top of the folding table arrangement can be pivoted into a functional position.

5. The holding receptacle as claimed in claim 1, wherein the interior receptacle of the box-shaped insert is a cooling receptacle, wherein the insert has a trapezoidal longitudinal section, and wherein a longitudinal extent of the cooling receptacle significantly exceeds its height.

6. The holding receptacle as claimed in claim 1, wherein a lid for the box-shaped insert is hinged on one of the supporting frame crossmembers, and wherein each of the supporting frame crossmembers has a rectangular basic surface with an indentation made in the upper longitudinal side thereof.

7. The holding receptacle as claimed in claim 1, wherein the further side wall structures are connected to each other by at least one approximately horizontally oriented crossmember structure.

8. The holding receptacle as claimed in claim 1, wherein the supporting frame side wall structures are covered at least in some regions on their sides by large paneling parts.

* * * * *